United States Patent
Sanders et al.

(10) Patent No.: US 12,147,400 B1
(45) Date of Patent: Nov. 19, 2024

(54) RELATIONAL DATABASE MIGRATION

(71) Applicant: INTERNATIONAL BUSINESS MACHINES CORPORATION, Armonk, NY (US)

(72) Inventors: Roger Everette Sanders, Fuquay Varina, NC (US); Martin G. Keen, Cary, NC (US); Khwaja Jawahar Jahangir Shaik, Jacksonville, FL (US)

(73) Assignee: INTERNATIONAL BUSINESS MACHINES CORPORATION, Amork, NY (US)

( * ) Notice: Subject to any disclaimer, the term of this patent is extended or adjusted under 35 U.S.C. 154(b) by 0 days.

(21) Appl. No.: 18/453,406

(22) Filed: Aug. 22, 2023

(51) Int. Cl.
*G06F 16/21* (2019.01)
*G06F 16/27* (2019.01)

(52) U.S. Cl.
CPC ............ *G06F 16/214* (2019.01); *G06F 16/27* (2019.01)

(58) Field of Classification Search
CPC ............................... G06F 16/214; G06F 16/27
USPC ........................................................ 707/609
See application file for complete search history.

(56) References Cited

U.S. PATENT DOCUMENTS

| | | | |
|---|---|---|---|
| 6,356,901 B1 * | 3/2002 | MacLeod et al. .... | G06F 16/254 |
| 6,704,747 B1 * | 3/2004 | Fong ...................... | G06F 16/252 |
| 6,907,546 B1 * | 6/2005 | Haswell .............. | G06F 11/3684 |
| | | | 717/124 |
| 7,599,947 B1 * | 10/2009 | Tolbert .................. | G06F 16/258 |
| 8,136,087 B2 * | 3/2012 | Gyure ..................... | G06F 9/451 |
| | | | 717/109 |
| 9,158,827 B1 * | 10/2015 | Vu ........................ | G06F 16/254 |
| 9,916,458 B2 | 3/2018 | Manville et al. | |
| 9,971,798 B2 * | 5/2018 | Khan ..................... | G06F 16/24 |
| 10,025,801 B2 * | 7/2018 | Kaufman ................ | G06F 16/21 |
| 10,360,242 B2 | 7/2019 | Wadhwa et al. | |

(Continued)

FOREIGN PATENT DOCUMENTS

| | | |
|---|---|---|
| CN | 106095991 A | 11/2016 |
| CN | 107391634 B | 4/2021 |

(Continued)

OTHER PUBLICATIONS

Advances in conceptual Modeling, Peter P. Chen David W. Embley Jacques Kouloumdjian Stephen W. Liddle John F. Roddick (Eds.). p. 1-390, Paris, France, Nov. 1999.*

(Continued)

*Primary Examiner* — Hicham Skhoun
(74) *Attorney, Agent, or Firm* — Teddi Maranzano, Esq.; Kevin P. Radigan, Esq.; Heslin Rothenberg Farley & Mesiti P.C.

(57) ABSTRACT

A relational database migration process is provided which includes migrating a relational database of a source relational database management system to a target relational database of a target relational database management system. The migrating includes identifying user-defined data objects of the relational database in the source relational database management system and generating statements to recreate the identified user-defined data objects of the source relational database in the target relational database management system. In addition, the migrating includes initiating execution of the statements to recreate the user-defined data objects of the relational database in the target relational database management system.

20 Claims, 9 Drawing Sheets

(56) References Cited

U.S. PATENT DOCUMENTS

| | | | |
|---|---|---|---|
| 10,691,654 B2 | 6/2020 | Higginson et al. | |
| 10,740,286 B1* | 8/2020 | Gilderman | G06F 9/5038 |
| 10,963,435 B1* | 3/2021 | McAlister | G06F 11/0766 |
| 11,256,671 B2 | 2/2022 | Buehne et al. | |
| 11,481,285 B1* | 10/2022 | Kessler | G06F 16/2282 |
| 11,567,660 B2 | 1/2023 | Chmiel et al. | |
| 11,615,062 B1 | 3/2023 | Waas et al. | |
| 11,625,240 B1 | 4/2023 | Rizzi et al. | |
| 2001/0042067 A1* | 11/2001 | Dayani-Fard | G06F 8/74 |
| | | | 707/999.102 |
| 2002/0107840 A1* | 8/2002 | Rishe | G06F 16/2423 |
| 2004/0193635 A1* | 9/2004 | Hsu | G06F 9/44505 |
| | | | 707/999.102 |
| 2007/0136324 A1* | 6/2007 | Xu | G06F 16/254 |
| 2010/0082646 A1* | 4/2010 | Meek | G06F 16/252 |
| | | | 707/752 |
| 2014/0201418 A1* | 7/2014 | Turner | H04L 67/01 |
| | | | 710/313 |
| 2018/0157653 A1 | 6/2018 | Wadhwa et al. | |
| 2022/0043836 A1* | 2/2022 | Upadhyay | G06N 20/00 |

FOREIGN PATENT DOCUMENTS

| | | |
|---|---|---|
| CN | 112631994 A | 4/2021 |
| CN | 112632038 A | 4/2021 |
| EP | 1857946 B1 | 4/2018 |
| WO | WO 2004/077215 A2 | 9/2004 |
| WO | WO 2022/162434 A1 | 8/2022 |

OTHER PUBLICATIONS

An approach for reverse engineering of relational databases. William J. Premerami and Michael R. Blaha. May 1994. pp. 1-49.*

Contribution_to_a_theory_of_database_reverse_engineering. J-L. Hainaut, M. Chandelon, C. Tonneau, M. Joris. IEEE 1993. pp. 161-170.*

Reengineering relational databases to object-oriented. Reda Alhajj and Faruk Polat. 2001 IEEE. pp. 335-344.*

Relational Database Reverse Engineering a Knowledge Based Approach. A. Saoud, G. Nachouk, H. Briand. 1997. pp. 180-194.*

Relational Database Reverse Engineering Algorithms to Extract Cardinality Constraints. Christian Soutou. 1998, pp. 161-207.*

Relational Database Reverse Engineering. David W. Embley and Mingkang Xu. 1997 IEEE. pp. 372-377.*

Reverse Engineering of Relational Database physical schema. Isabelle Comyn-Wattiau and Jacky Akoka. pp. 374-391.*

Reverse_engineering_of_relational_database_application. Mark W.W. Vermeer and Peter M.G. Apers. pp. 90-100.*

Towards_the_reverse_engineering_of_renormalized_relational_databases. J-M. Petit, F. Toumani, J-F. Boulicaut, J. Kouloumdjian. 1996 IEEE. pp. 218-225.*

Transformation-based Database Reverse Engineering. J-L. Hainaut, C. Tonneau, M. Joris, M. Chandelon. pp. 364-375.*

Briers, James, "How Do You Put Your Data First So Your Migration Suceeds?", Dataversity.Net, published Online Nov. 15, 2019 at: https://www.dataversity.net/how-do-you-put-your-data-first-so-your-migration-succeeds/ (4 pages) (Year: 2019).

Ellison et al., "Evaluating Cloud Database Migration Options Using Workload Models", Journal of Cloud Computing: Advances, Systems and Applications, vol. 7, No. 6 (18 pages) (Year: 2018).

IBM, "Ingest Utility Restrictions and Limitations", published/updated Online Feb. 3, 2023 at: https://www.ibm.com/docs/en/db2/11.5?topic=utility-ingest-restrictions-limitations (3 pages) (Year: 2023).

Kwon et al., "Cloud Refactoring: Automated Transitioning to Cloud-Based Services", Automated Software Engineering, Manuscript No. 21 (30 pages) (Year: 2014).

* cited by examiner

RELATIONAL DATABASE MIGRATION

BACKGROUND

This disclosure relates generally to facilitating processing within a computing environment, and more particularly, to facilitating enhanced relational database migration.

A relational database is a type of data repository that organizes data based on a relational model, that arranges data into rows and columns, which collectively form a table. An advantage of relational databases is their ability to store specific data values once and create meaningful information by joining tables to obtain any combination of data values. Joining tables requires an understanding of relationships between database data, and how tables connect. Statements, written in structured query language (SQL), can be used in association with relational databases, and provide the ability to store, modify, remove, or retrieve data, as well as count, group, and combine queries. SQL statements can also be used to perform basic math functions and logical transformations. Relational databases can also eliminate data redundancies, can be transactional or analytical in nature, and can guarantee the state of the entire system is consistent at any moment.

SUMMARY

Certain shortcomings of the prior art are overcome, and additional advantages are provided herein through the provision of a computer-implemented method of facilitating processing within a computing environment. The computer-implemented method includes migrating a relational database of a source relational database management system (RDBMS) to a target relational database of a target relational database management system. The migration includes identifying user-defined data objects of the relational database in the source relational database management system, and generating statements to recreate the identified user-defined data objects of the relational database in the target relational database management system. In addition, the migrating includes initiating execution of the statements to recreate the user-defined data objects of the relational database in the target relational database management system.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present disclosure and, together with this detailed description of the disclosure, serve to explain aspects of the present disclosure. Note in this regard that descriptions of well-known systems, devices, processing techniques, etc., are omitted so as to not unnecessarily obscure the disclosure in detail. It should be understood, however, that the detailed description and specific example(s), while indicating aspects of the disclosure, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, systems, or tools only as examples, and not by way of limitation. Furthermore, the illustrative embodiments are described in certain instances using particular software, hardware, tools, and/or data processing environments only as example for clarity of description. The illustrative embodiments can be used in conjunction with other comparable or similarly purposed structures, systems, applications, architectures, etc. One or more aspects of an illustrative control embodiment can be implemented in software, hardware, or a combination thereof.

Figure 1:
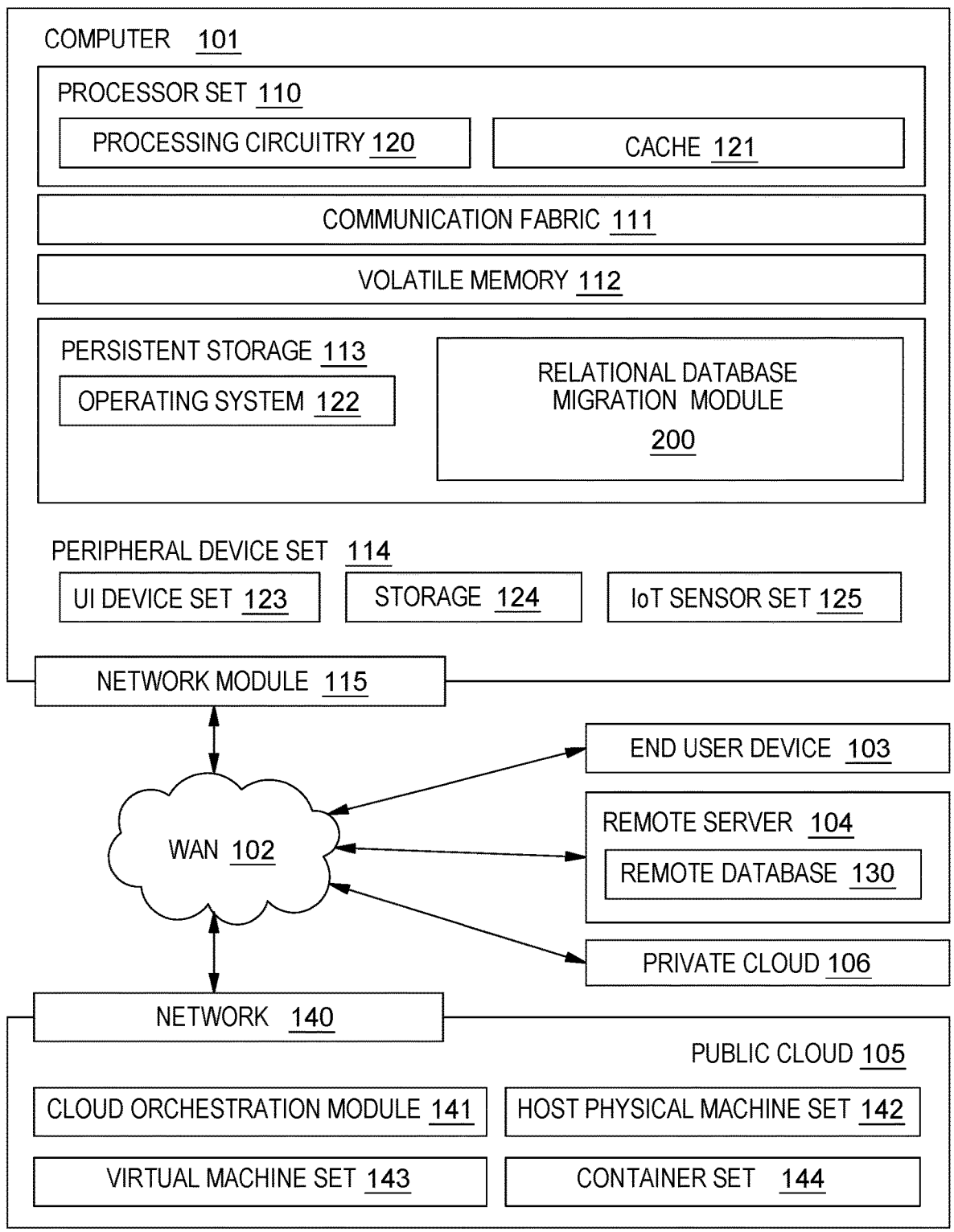
FIG. 1 depicts one example of a computing environment to include and/or use one or more aspects of the present disclosure.

As understood by one skilled in the art, program code, as referred to in this application, can include software and/or hardware. For example, program code in certain embodiments of the present disclosure can utilize a software-based implementation of the functions described, while other embodiments can include fixed function hardware. Certain embodiments combine both types of program code. Examples of program code, also referred to as one or more programs, are depicted in FIG. 1, including operating system 122 and relational database migration module 200, which are stored in persistent storage 113.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform relational database migration processing, such as disclosed herein. Aspects of the present disclosure are not limited to a particular architecture or environment.

Prior to further describing detailed embodiments of the present disclosure, an example of a computing environment to include and/or use one or more aspects of the present disclosure is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as relational database migration module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. Further, in one or more embodiments, one or more of the components/modules of FIG. 1 need not be included in the computing environment and/or are not used for one or more aspects of the present disclosure. Further, in one or more embodiments, additional and/or other components/modules can be used. Other variations are possible.

Figure 2:
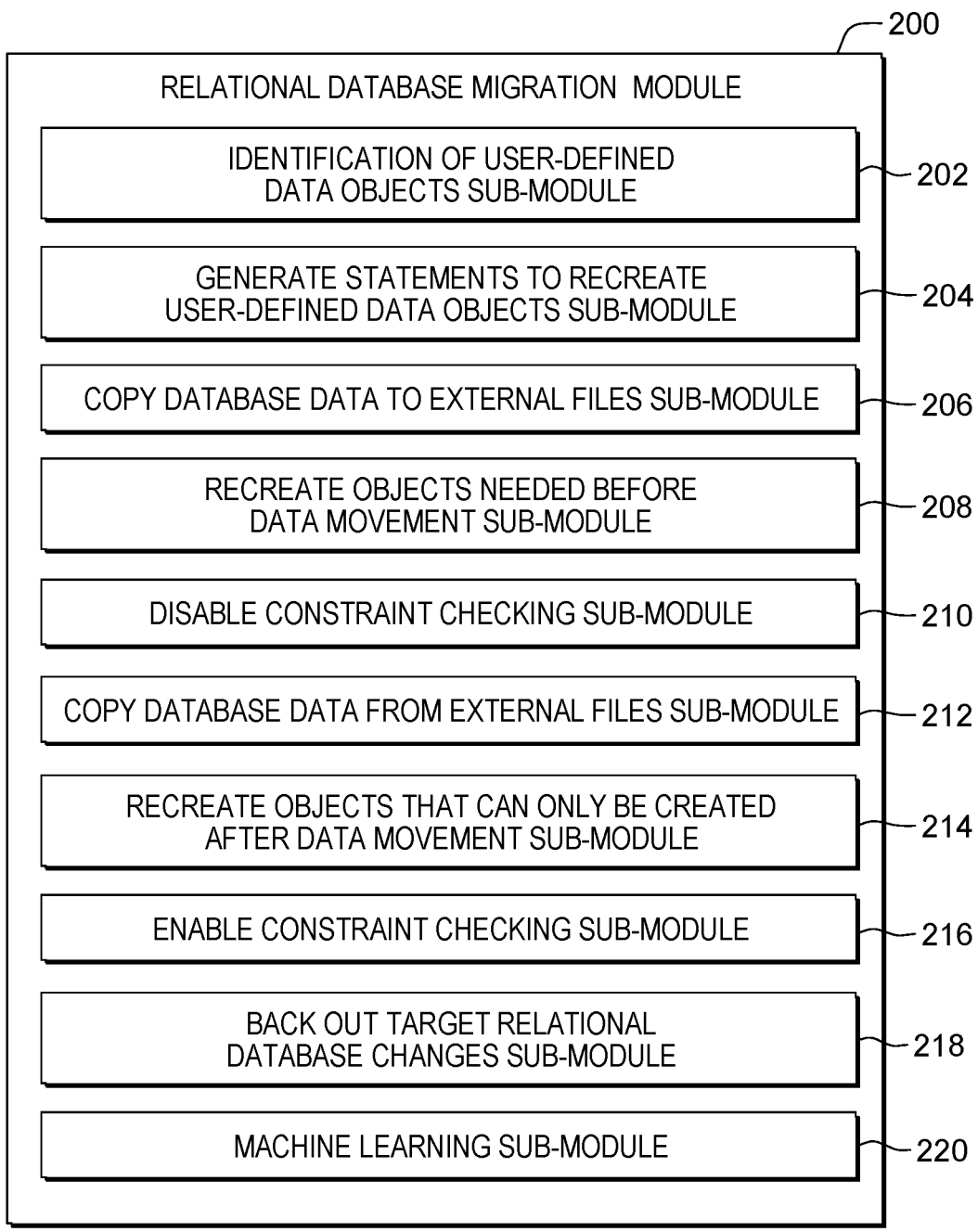
FIG. 2 depicts one embodiment of a computer program product with a relational database migration module, in accordance with one or more aspects of the present disclosure.
Figure 3:
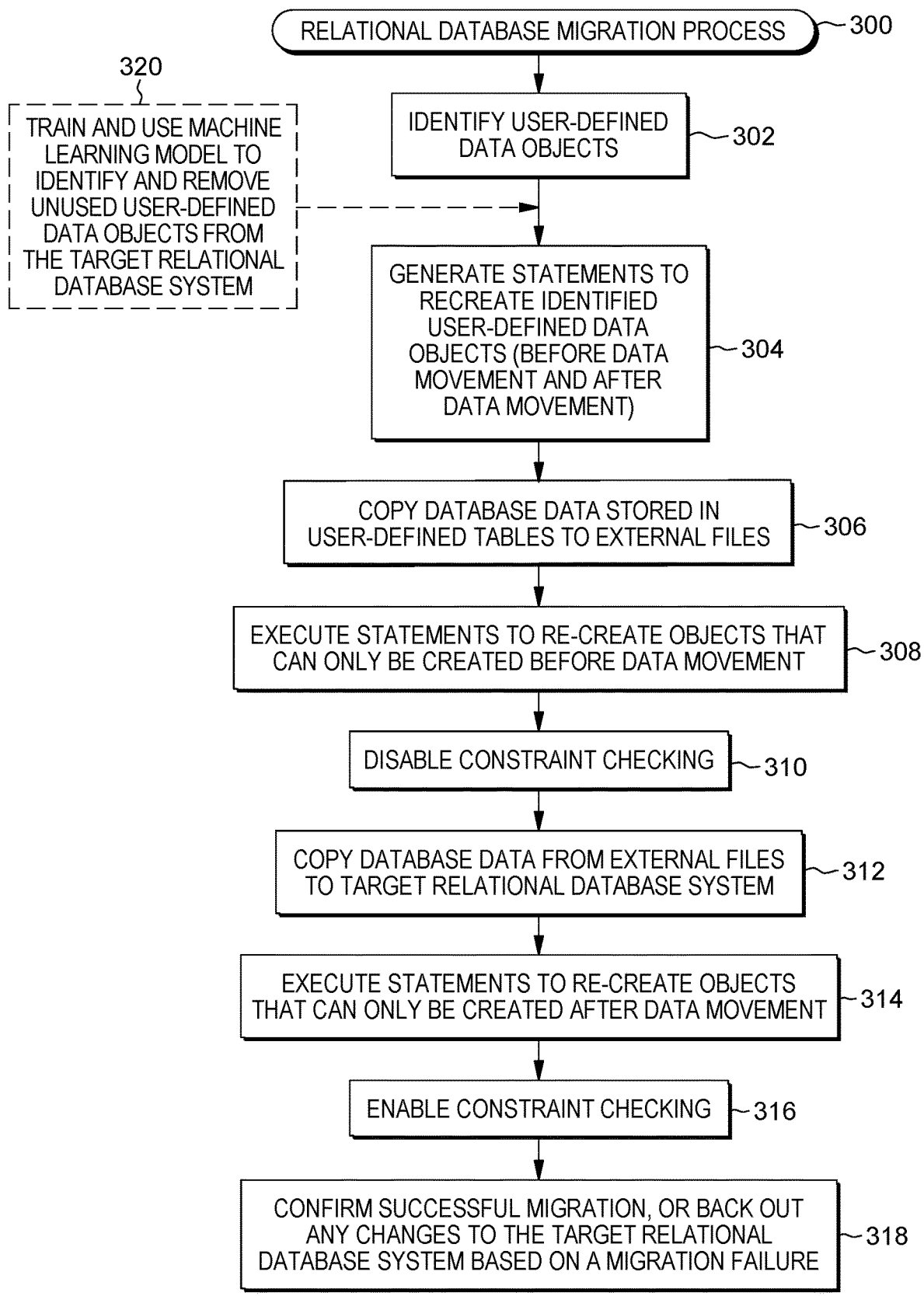
FIG. 3 depicts one embodiment of a relational database migration workflow, in accordance with one or more aspects of the present disclosure.

By way of example, one or more embodiments of a relational database migration module and process are described initially with reference to FIGS. 2-3. FIG. 2 depicts one embodiment of relational database migration module 200 that includes code or instructions to perform relational database migration processing, in accordance with one or more aspects of the present disclosure, and FIG. 3 depicts one embodiment of a relational database migration process, in accordance with one or more aspects of the present disclosure.

Referring to FIGS. 1-2, relational database migration module 200 includes, in one example, various sub-modules used to perform processing, in accordance with one or more aspects of the present disclosure. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

As noted, FIG. 2 depicts one embodiment of a relational database migration module 200 which, in one or more embodiments, includes, or provides relational database migration processing in accordance with one or more aspects of the present disclosure. In the embodiment of FIG. 2, example sub-modules of relational database migration module 200 include an identification of user-defined data objects sub-module 202 to identify user-defined data objects (e.g., user-defined tables, indexes, views, etc.) of a relational database (or source relational database) of a source relational database management system to be migrated, and generate statements to recreate user-defined data objects sub-module 204 to generate statements to recreate the identified user-defined data objects of the relational database in a target relational database management system, such as a fully managed target relational database management system. Note that a fully managed relational database management system is a system where another party (such as a cloud service provider) is responsible for providing an organization with the technology, tools, resources (computing hardware, electricity, heating, ventilation, air conditioning, etc.), expertise, time, commitment, and processes required to ensure the relational database environment is always available and accessible.

In one or more embodiments, relational database migration module 200 also includes a copy database data to external files sub-module 206 to copy database data stored in user-defined tables of the relational database in the source relational database management system to external files, and a recreate objects needed before data movement sub-module 208 to execute one or more of the generated statements to recreate a subset of the identified user-defined data objects in the target relational database needed before copying the database data of the source relational database into the target relational database.

In one or more embodiments, relational database migration module 200 further includes a disable constraint checking sub-module 210 to temporarily disable constraint checking in the target relational database by, for instance, identifying one or more data constraints created in the target relational database based on recreating the subset of user-defined data objects in the target relational database, and converting the identified data constraint(s) into an unenforced constraint(s), such as an informational or similar constraint, which is not enforced within the target relational database. In addition, relational database migration module 200 includes, in one or more embodiments, a copy database data from external files sub-module 212 to copy the database data stored in the external files to respective tables in the target relational database and a recreate objects that can only be created after data movement sub-module 214, which executes one or more of the generated statements to recreate another subset of the user-defined data objects in the target relational database that can only be created after the database data has been copied into the target relational database. In addition, relational database migration module 200 includes an enable constraint checking sub-module 216, which returns the unenforced data constraint(s) to one or more enforced data constraint(s) of the target relational database.

In one or more embodiments, relational database migration module 200 further includes a back out target relational database changes sub-module 218 to back out any changes to the target relational database from a failed migration of data and/or objects of the relational database of the source relational database management system to the target relational database.

In one or more embodiments, relational database migration module 200 further includes a machine learning sub-module 220 to, for instance, train a machine learning model to identify unused user-defined data objects of the relational database in the source relational database, and to prevent the unused user-defined data objects of the relational database from being recreated and/or retained in the target relational database.

Advantageously, relational database migration module processing such as disclosed herein facilitates, in one or more embodiments, computing environment processing by, for instance, providing a more efficient process for migrating a relational database of a source system (i.e., source relational database management system) to a target system (i.e., target relational database management system). In one or more embodiments, the relational database migration process facilitates migrating, for instance, an on-premises relational database to a cloud-based relational database environment, and in particular, to a fully managed cloud-based database environment. In one or more aspects, the relational database migration disclosed herein allows for a selected, relational database to be migrated, and automatically ensures that all used user-defined data objects (e.g., tables, indexes, views, stored procedures, etc.) of the database, together with each object's associated data, are replicated in the target relational database in a single step. In one or more aspects, one or more machine learning models are trained to assist in identifying user-defined data objects of the relational database that exist in the source relational database but are not being used, and to remove those identified unused user-defined data objects from the target relational database either before, during or after migration has occurred. In one or more aspects disclosed herein, user-defined system objects (e.g., buffer pools, storage groups and table spaces) can also be consolidated into default system objects used by the target relational database, such as those used in a fully managed relational database management system.

Note that although various sub-modules are described herein, relational database migration module processing, such as disclosed can use, or include, additional, fewer, and/or different sub-modules. A particular sub-module can include additional code, including code of other sub-modules, or less code. Further, additional and/or other sub-modules can be used. Many variations are possible.

In one or more embodiments, the sub-modules are used, in accordance with one or more aspects of the present disclosure, to perform relational database migration processing. FIG. 3 depicts one example of a relational database migration process, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as relational database migration module 200. In other examples, the code can be included in one or more other modules and/or in one or more sub-modules of the one or more other modules. Various options are available.

As one example, relational database migration process 300 executing on a computer (e.g., computer 101 of FIG. 1), a processor (e.g., a processor of processor set 110 of FIG. 1), and/or processing circuitry (e.g., processing circuitry of processor set 110), migrates a relational database of a source relational database management system to a target relational database, where the migration includes identifying user-defined data objects 302 of the relational database. For instance, in one or more embodiments, all user-defined data objects of the relational database being migrated are identified including, for instance, both used user-defined data objects and unused data-defined data objects of the relational database in the source relational database. In one or more embodiments, relational database migration process 300 further includes generating statements to recreate the identified user-defined data objects 304 in the target relational database. In one or more embodiments, this includes a subset of the identified user-defined data objects to be recreated in the target relational database before copying of the database data into the target relational database, and another subset of the user-defined data objects that can only be created accurately in the target relational database after the database data has been copied into the target relational database.

In one or more embodiments, the relational database migration process 300 further includes copying database data stored in user-defined tables of the relational database in the source relational database management system to external files 306, and executing one or more of the generated statements to recreate the subset of the identified user-defined data objects in the target relational database needed before the copying of the database data into the target relational database 308. In one or more implementations, the identifying user-defined data objects 302 identifies all user-defined data objects of the relational database in the source relational database management system, including both currently used user-defined data objects and unused user-defined data objects of the relational database, and the generating includes generating structured query language statements to recreate the identified user-defined data objects in the target relational database. In one or more embodiments, generating the statements to recreate the identified user-defined data objects includes preparing, for instance, the structured query language statements. Preparing the statements can include recompiling the SQL statement(s) and creating an access plan for each statement, with the access plan being kept as long as the statement exists. In this manner, the statement(s) can be re-executed if needed.

In one or more embodiments, relational database migration process 300 further includes disabling constraint checking at the target relational database 310. In one embodiment, this can include identifying one or more data constraints created in the target relational database based on recreating the subset of user-defined data objects in the target relational database and converting the identified data constraint(s) into an unenforced constraint(s), such as an informational or similar constraint, which is not enforced in the target relational database. In one or more embodiments, relational database migration process 300 includes copying the database data from the external files to the target relational database management system 312 and executing one or more of the generated statements to recreate another subset of the user-defined data objects of the relational database in the target relational database management system that can only be created after the database data has been copied into the target relational database 314. During this process, the constraint check(s) remain disabled. In one or more embodiments, relational database migration process 300 further includes enabling constraint checking 316 by, for instance, returning any unenforced data constraints to data constraints that are enforceable by the target relational database management system. In one or more embodiments, returning the one or more informational or similar "not enforced" data constraint(s) to enforced data constraint(s) is based on copying the database data from the external files to the target relational database, and recreating the other subset of the user-defined data objects of the relational database in the target relational database management system.

In one or more embodiments, relational database migration process 300 further includes confirming successful migration, or backing out any migration-related changes to the target relational database based on detection of a migration failure 318. In one or more embodiments, based on detecting failure of the migration process, any changes to the target relational database from the failed migration of the relational database, such as the database data and/or the user-defined data objects of the relational database, are backed out of the target relational database management system.

In one or more embodiments, relational database migration process 300 further optionally includes training and using one or more machine learning models to identify and/or remove unused user data objects of the relational database in the source relational database management system from the target relational database. For instance, in one or more embodiments, the trained machine learning model(s) facilitates identifying and blocking the migration of unused user-defined data objects of the relational database to the target relational database, or identifying and removing migrated, unused user-defined data objects of the relational database from the target relational database.

In general, database migration, and in particular, relational database migration, can be one of the more difficult aspects of transitioning a relational database management system (such as an on-premises relational database management system) to a cloud-based relational database management system, often requiring an amount of downtime, and reworking of existing data schemas, as well as refactoring of applications that interact with the database(s) being moved. In fact, the time and expense in moving large databases and data to a cloud-based system is proving to be a heavy burden that slows the pace of cloud adoption.

In one or more implementations, complexity of, for instance, migrating a relational database to a target relational database management system is largely dependent upon whether the same database engine is being used on both platforms. For instance, homogeneous data migrations (that is, where the database engine used in the source relational database management system is the same as the database engine used in the target relational database management system) typically involves "lifting and shifting" the relational database from its current physical or virtual environment onto a target physical or virtual environment (such as a cloud-based infrastructure). These types of migrations require few, if any, data changes and possibly an incremental evolution of the database's structure. On the other hand, heterogeneous migrations (i.e., where the database engine in the target relational database management system differs from the database engine used in the source relational database management system) can be very complex and may require the database structure to be completely redesigned. Additionally, data stored in the source relational database management system will often need to undergo transformation as part of the migration process.

Regardless of whether a homogeneous or heterogeneous migration is required, a properly orchestrated migration needs to minimize complexity of moving the relational database to the target relational database management system, while ensuring that the security of confidential data is maintained in a way that does not violate data privacy regulations such as, for instance, the Health Insurance Portability and Accountability Act (HIPAA), the Payment Card Industry Data Security Standard (PCI-DSS), the European Union's General Data Protection Regulation (GDPR), the California Consumer Privacy Act, etc.

A relational database consists of many physical and logical components, all of which aid in the storage, modification and retrieval of data. While the bulk of the components are user-defined data objects (or data structures) that control how data is stored and, in certain cases, how it is organized, the remaining components form a comprehensive infrastructure that provides, among other things, optimum performance, data integrity and high availability. Unlike data objects, these system objects are controlled and accessed primarily by the database engine itself and not by users (even though some of the system objects may be user-defined).

Unfortunately, most database migration solutions focus on moving data from individual tables manually, one table at a time. Not only does this approach not scale, it also does not address the migration of any other types of data objects that may have been defined in the database. If these additional objects are not replicated in the target database, then applications that rely on them will be unable to interact with the target database after the migration is complete.

In a typical database migration today, the migration methods do not migrate most data objects automatically, and an authorized user typically uses a data extraction utility, such as a database vendor supplied utility to move each data file (typically in clear text) into the target database via an Import, Ingest or similar utility of the target database. Data objects to be moved can include, for instance, aliases, schemas, tables, indexes, views, constraints, triggers, sequences, user-defined data types, SQL user-defined functions, external user-defined functions, SQL procedures and/or external procedures. The types of tables available can include, for instance, base (or regular) tables, multidimensional clustering (MDC) tables, insert time clustering (ITC) tables, range-clustered tables (RCT), partitioned tables, temporal tables, created temporary tables and/or materialized query tables (MQTs).

In addition to data objects, the relational database can include system objects, as well as security objects. In one or more embodiments, the system objects can include storage groups, buffer pools, table spaces, audit policies and/or event monitors, any one or more of which may or may not be movable to a target relational database. In addition, in one or more embodiments, the security objects can include, for instance, security roles, security labels, security policies, row permissions, column masks, etc. The system objects typically are not movable to the target relational database, such as a cloud-based target relational database.

It is relatively easy to create objects in a relational database and most objects are created only after a database designer has determined what types of data must be stored and how the data is interrelated. However, during application development and testing, it is not uncommon for additional objects to be defined that were not part of the original database design. While some of these objects can be kept to support design changes, others can remain long after they are no longer needed. Over time, the accumulation of unnecessary and unused objects can become significant, resulting in additional maintenance and overhead, as well as confusion when trying to understand how all the objects work together. Consequently, it is advantageous during migration to identify unused (i.e., unnecessary) objects for elimination.

In one or more aspects, the relational database migration process described herein facilitates secure migration of a source relational database to a target relational database, such as in a cloud-based environment. The disclosed process automates and streamlines relational database migration by obtaining, for instance, information about all user-defined objects that have been created in a source relational database (e.g., an on-premises database). This information about all user-defined data objects includes more than just tables, schemas and indexes. In one or more implementations, the relational database migration process generates, for instance, structured query language (SQL) data definition language (DDL) statements for use in recreating the identified user-defined data objects in the target relational database in the appropriate order, and populating those data objects with database data obtained from the source relational database, for instance, using, in one or more aspects, functionality provided by native relational database tools, either associated with the source relational database management system or the target relational database management system. In one or more embodiments, artificial intelligence algorithms (e.g., machine learning models) are trained and used to identify data objects in the relational database that are not being used, and to eliminate those data objects in the target relational database as part of the migration process.

In one or more embodiments, the relational database migration process disclosed herein advantageously automatically locates all user-defined objects that have been created in the relational database being migrated and recreates them in the target relational database in the appropriate order. The user-defined objects can be located using, for instance, Open Database Connectivity (ODBC) Application Programming Interface (API) function calls, in one embodiment. In addition, the relational database migration process automatically identifies all user-defined system objects that exist in the relational database, and that cannot be recreated in the target relational database and modifies the definition of each data object that relies on those system objects such that they utilize native predefined (i.e., default) system objects provided with the managed target relational database. In another aspect, the relational database migration process automatically extracts data from every user-defined table in the relational database and copies the data to the target relational database (e.g., in one embodiment, a cloud-based database) using, for instance, a fastest method possible while ensuring that the data is also copied to a standby server automatically during the migration process. In one or more aspects, the relational database migration process also provides an ability to back out all changes made to the target relational database in the event that the migration process fails, or is terminated prematurely. In one or more embodiments, the relational database migration process preserves data security by ensuring "plain-text" copies of data extracted from the relational database do not leave, for instance, the source system (e.g., client's data center). In one or more embodiments, the relational database migration process trains and uses one or more machine learning models to identify user-defined data objects (such as tables, views, stored procedures, user-defined functions, etc.) that exist in the relational database and that are unused (e.g., not being used and/or unnecessary), and removes those user-defined data objects from the target relational database as part of the migration process. In one or more further embodiments, the relational database migration process moves user-defined objects and database data from, for instance, the source relational database (such as one or more on-premise relational databases) to the target relational database (such as one or more cloud-based relational databases), where the source relational database and the target relational database can utilize homogeneous or heterogeneous relational database management systems.

Figure 4:
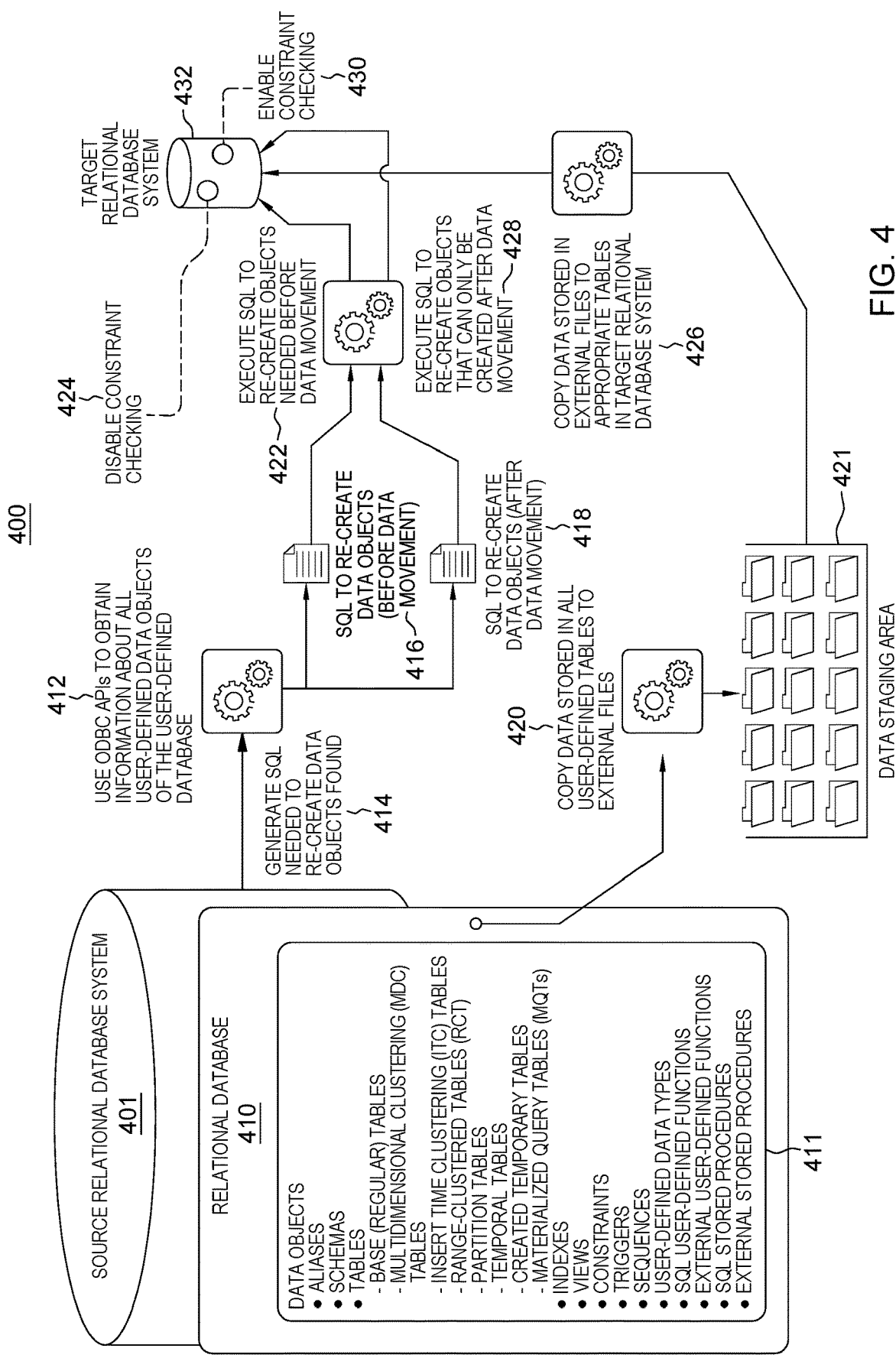
FIG. 4 is a more detailed embodiment of a relational database migration workflow, in accordance with one or more aspects of the present disclosure.

FIG. 4 depicts another embodiment of a computing environment 400 and a relational database migration workflow, in accordance with one or more aspects of the present disclosure. In one or more embodiments, computing environment 400 includes, or is implemented as part of, a computing environment such as computing environment 100 described above in connection with FIG. 1. Computing environment 400 includes, by way of example, a source relational database management system 401 with a relational database 410 (e.g., a user-defined relational database, such as an on-premises relational database), and a target relational database 432 (e.g., a cloud-based relational database management system), to host the migrated database. By way of example only, in one or more embodiments, relational database 410 and/or the target relational database can be, for instance, an International Business Machines Db2® relational database. (Db2 is a registered trademark of International Business Machines Corporation, Armonk, NY (USA) in at least one jurisdiction.) As an example, when moving a source relational database (e.g., a legacy, on-premises database) to a cloud-based database environment, several components can be used for the migration. These include the database structure (such as a schema), and user-defined data objects, database data, database code (user-defined functions, stored procedures, materialized query tables (MQTs), views, triggers, and other in-database code), and application source code that is dependent upon, or tightly coupled with, the database (such as external user-defined functions and external storage procedures (such as those that can be created with a database product at issue)). Certain of the components noted will need to be converted or transformed prior to, during or after the migration process.

As illustrated in FIG. 4, in one or more embodiments, relational database 410 includes user-defined data objects 411 such as aliases, schemas, tables, indexes, views, constraints, triggers, sequences, user-defined data types, SQL user-defined functions, external user-defined functions, SQL stored procedures and external stored procedures. In the embodiment illustrated, the table data objects can include, for instance, base (regular) tables, multidimensional clustering (MDC) tables, insert time clustering (ITC) tables, range-clustered tables (RCT) partitioned tables, temporal tables, created temporary tables, and materialized query tables (MQTs). Note in this regard that program source code for external user-defined functions and external storage procedures may need to be manually copied to the target server and then recompiled before they are to be used on the target relational database. In one or more embodiments, the relational database migration process identifies these types of objects and provides guidance on how to migrate them to the target relational database, but is otherwise unable to move the program source code for external user-defined functions and external procedures automatically due to the extra steps required. Note that in one or more embodiments, all other data objects 411 noted with respect to FIG. 4 can be automatically identified and migrated in accordance with the relational database migration process described herein.

As illustrated in FIG. 4, the relational database migration process includes obtaining information about all user-defined data objects in the source relational database 412. In one embodiment, the Opened Database Connectivity (ODBC) Application Programming Interface (API), which is a standard API for accessing relational database management systems, is used to obtain the information needed to recreate user-defined data objects 411 found in the relational database 410. ODBC utilizes an architecture in which data source-specific ODBC libraries (known as drivers) are dynamically loaded and unloaded at application runtime by a component known as the ODBC driver manager. Each driver is responsible for processing ODBC application programming interface (API) function calls, submitting SQL requests to a data source, returning results from that data source, and if appropriate, modifying an application's request so it conforms to the SQL syntax supported by the data source used. Applications call ODBC APIs to submit SQL statements and retrieve results and that information is sent to the ODBC driver manager, where it is examined and routed to the appropriate ODBC driver for processing. Thus, by using ODBC APIs, an application developed for one relational database management system can be executed against another relational database management system without having to be altered, provided a connection is established to the new relational database management system. Most relational database management systems today support the ODBC specification. By creating an application that calls the following ODBC APIs, it is possible to obtain the information noted herein to recreate any user-defined data objects found in a relational database management system (data source) that has an associated ODBC driver:

SQLGetTypeInfo( ) Returns information about the data types that are supported by the data source;

SQLTables( ) Returns a list of table, catalog, or schema names, and table types, that are found in the data source;

SQLColumns( ) Returns information about the columns that have been defined for a specific table;

SQLSpecialColumns( ) Retrieves the optimal set of columns that uniquely identifies a row in a specific table, as well as information about columns that are automatically updated when any value in a row is updated by a transaction;

SQLPrimaryKeys( ) Returns a list of column names that make up the primary key for a table;

SQLForeignKeys( ) Returns a list of foreign keys in a specified table (columns in the specified table that refer to primary keys in other tables), as well as a list of foreign keys in other tables that refer to the primary key that has been defined for the table specified;

SQLStatistics( ) Retrieves a list of statistics about a single table, along with information about all indexes associated with that table;

SQLProcedures( ) Returns a list of procedure names found in a data source. (Here, procedure is a generic term used to describe an executable object or named entity that can be invoked using input and output parameters. In other words, user-defined functions, stored procedures, and in some cases, triggers.); and SQLProcedureColumns( ) Returns a list of input and output parameters, as well as information about the columns that make up the result set returned by a specified procedure.

Those skilled in the art should note, however, that the above-noted approach to reverse engineering the source relational database to obtain, for instance, the user-defined data objects is one embodiment only. In one or more other implementations, utilities provided by the relational database management system of the source relational database can be used to extract the information (in one embodiment). Depending on the other implementation, the generated statements in the output file produced may need to be altered before they can be used to recreate the user-defined objects found in the source relational database.

Once detailed information about each user-defined data object in the source relational database has been obtained, it can be used to generate SQL DDL statements that, when executed, will recreate those objects in the target relational database, such as a cloud-based, target relational database. Because objects in a relational database often have interdependencies with other objects, there can be a specific order in which the DDL statements used to recreate the relational database objects will need to be executed. For example, the DDL statements used to create a view that is dependent upon one or more tables can only be successfully executed if the table(s) upon which the view depends already exist within the relational database. Consequently, the DDL statement used to create the table(s) must be executed first. Otherwise, an error will occur. In addition, when moving a complete database from one platform to another, certain objects, such as triggers and materialized query tables (MQTs) can or should only be recreated in the target relational database after all other data objects have been populated. This prevents insert and update triggers from executing during the migration process. In addition, this enables MQTs to be successfully created. This is because an MQT is populated with precomputed results that are obtained from tables the MQT is based on, meaning all dependent tables must be populated before the relational database management system can produce the information needed to populate the MQT. Since some data objects must be created before data can be moved and others can only be created after data migration has occurred, the SQL DDL statements produced are written to two separate files, that is, one containing SQL statements to recreate data objects before data movement 416 and the other containing SQL statements to recreate data objects after data movement 418. In one or more embodiments, a third file can also be produced that contains SQL statements needed to delete every user-defined data object that is created in the target relational database during the migration process. This enables the user to quickly backout changes made to the target relational database in the event that the migration operation fails or is terminated prematurely.

Figure 5A:
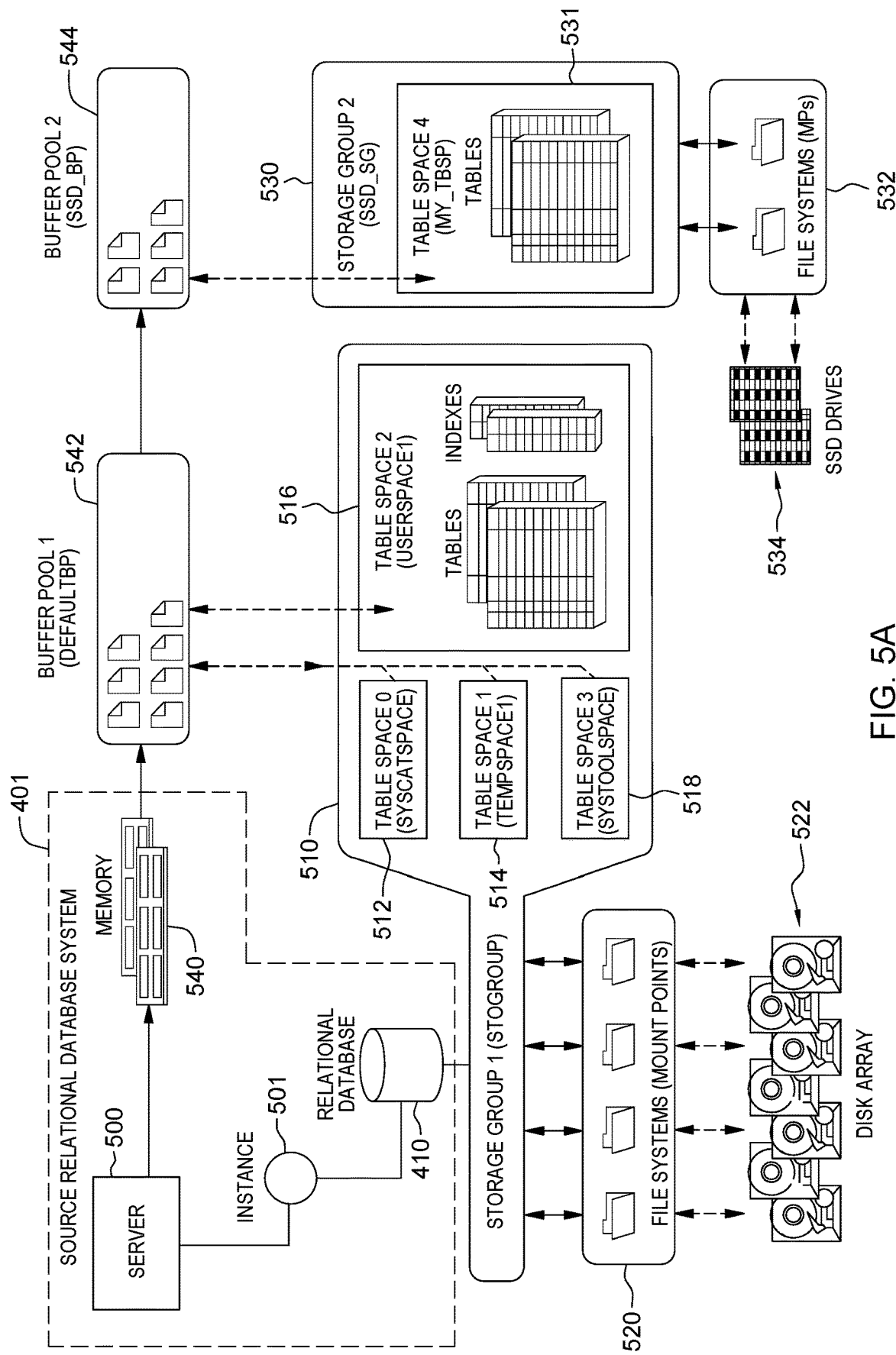
FIGS. 5A-5C illustrate one embodiment of a relational database migration workflow for handling user-defined system objects, in accordance with one or more aspects of the present disclosure.
Figure 5B:
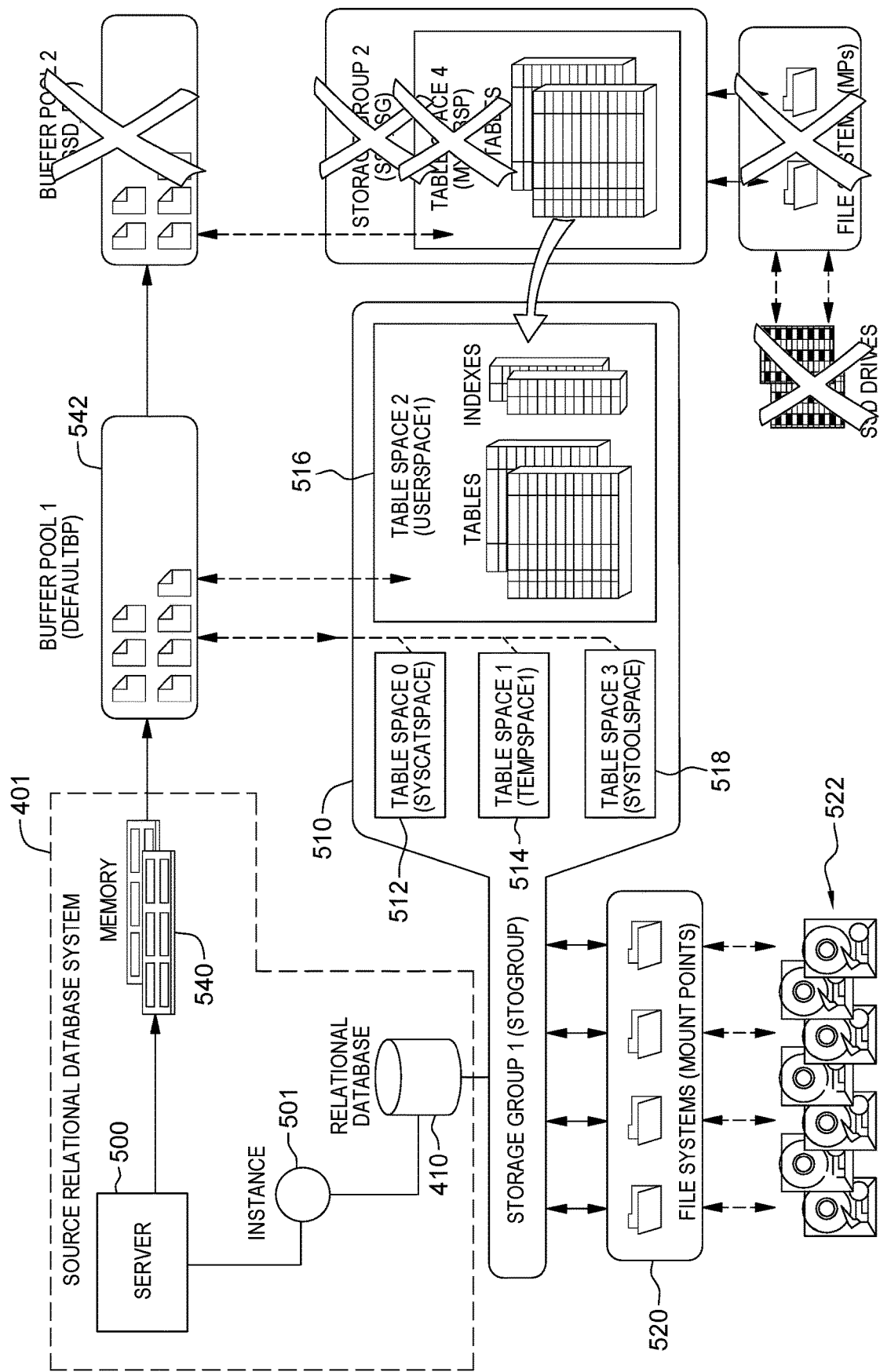
Figure 5C:
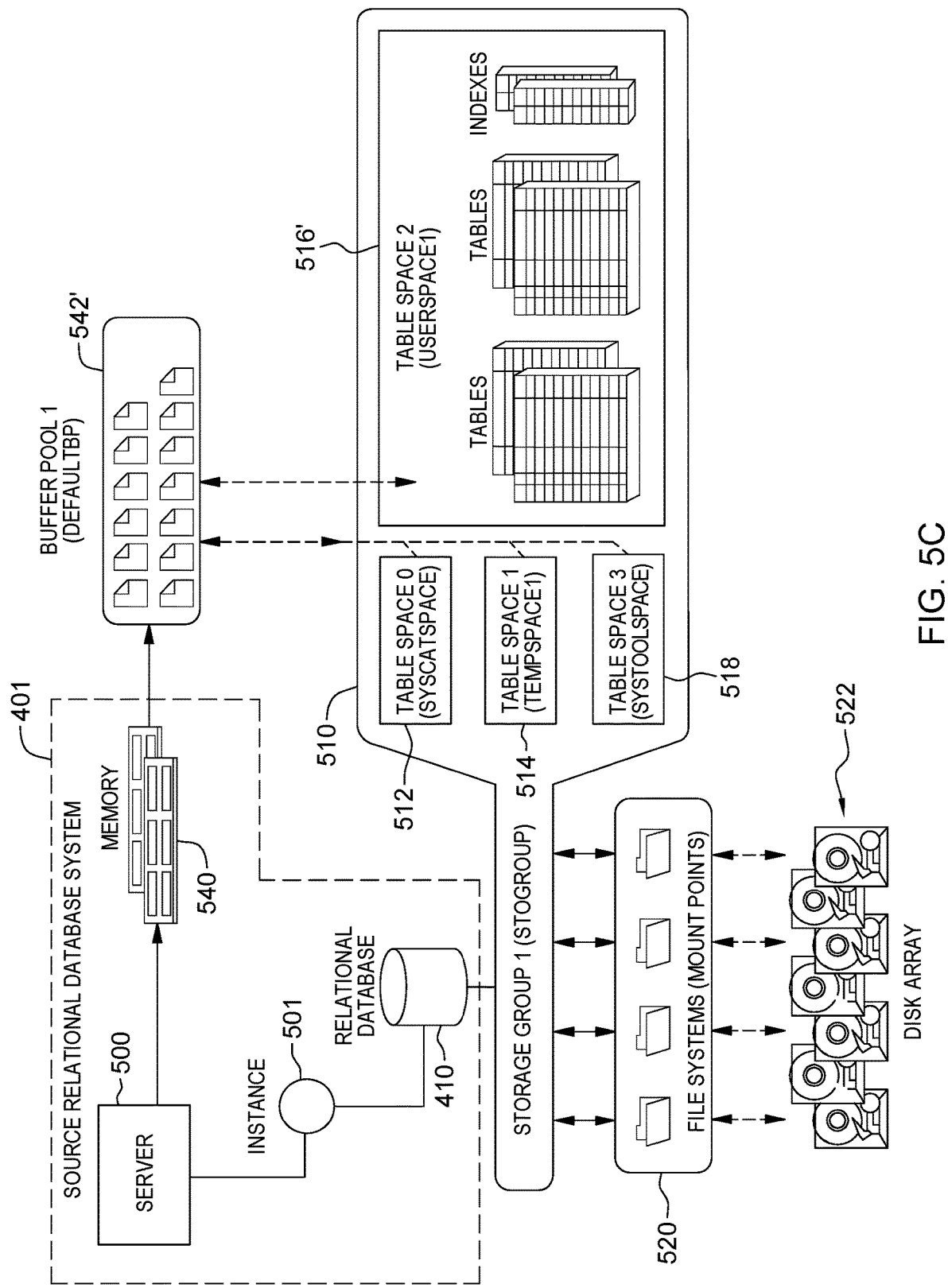

With certain source relational databases (e.g., certain on-premises relational databases), it is possible for a user to create user-defined system objects, such as buffer pools (objects used to cache data pages in memory) and table spaces (objects that provide a layer of indirection between data objects and storage, where the object's data physically resides). FIG. 5A illustrates one embodiment of a source relational database (e.g., relational database 410) with default system objects, including a storage group 510, with table spaces 512-518 and a buffer pool 542, as well as three user-defined system objects, including a storage group 530, a buffer pool 544, and a table space 531. As illustrated, one or more servers 500 and memory 540, or more generally, computing resources of the source system, support an associated instance 501 of a relational database 410, such as described herein. In one or more embodiments, the relational database migration workflow example of FIGS. 5A-5C is implemented as part of a computing environment, such as computing environment 100 described above in connection with FIG. 1. In the embodiment of FIGS. 5A-5C, file system mount points 520 route data to and from the relational database from one or more disc arrays 522 (in one example only), and in particular, via storage group 1 510, which is an example of a system object. In the embodiment depicted, storage group 1 includes table space 0 512 (SYSCATSPACE), table space 1 (TEMPSPACE1) 514, table space 2 516 (USERSPACE1), and table space 3 518 (SYSTOOLSPACE). In addition, a user-defined storage group 2 530 (SSD_SD) receives and/or transmits database data from file systems (mount points) 532 that correspond to SSD drives 534. Storage group 2 530 includes a user-defined table space 4 (MY_TBSP) 531. In addition, user-defined system object buffer pool 2 (SSD_BP) 544 exists in the example. Note again that the system objects of FIGS. 5A-5C are presented by way of example only.

Certain managed relational databases support the use of only one table space (e.g., USERSPACE1) for storing data objects and one buffer pool (e.g., DEFAULTBP) for caching data pages. Consequently, when a relational database is moved to a managed relational database environment, user-defined system objects that have been created for the source relational database cannot necessarily be replicated as part of the migration process. By way of example, FIG. 5B highlights certain user-defined system objects that cannot be moved, in one or more embodiments, as part of the source to target relational database transition of FIG. 5A. As illustrated in FIG. 5B, certain objects that have been created as user-defined system objects for the relational database need to be redefined for the migration. For instance, as one example, one or more user-defined storage group and table space system objects in the source relational database (depending on the target relational database) may need to be redefined such that any user-defined data objects (e.g., tables, indexes, views, stored procedures, etc.) are moved to the default storage group and table space, for instance, USERSPACE1, and one or more user-defined buffer pool system objects may need to be redefined to utilize, for instance, the target relational database's default buffer pool (DEFAULTBP) for data caching. Examples of this are illustrated in FIG. 5C, which is representative of one embodiment of how the target relational database can look after the source relational database of FIG. 5A has been successfully migrated. As illustrated in FIG. 5C, user-defined data objects (e.g., tables) residing in user-defined storage group and user-defined table space system objects of FIG. 5A are moved into the default storage group 516' (USERSPACE1) of the target relational database, and user-defined buffer pool system objects of FIG. 5A are rolled into the single default buffer pool system object 542' (DEFAULTBP) of the target relational database, which again is one example only. Because of this, before the generated SQL DDL statements to recreate the data objects 414 (FIG. 4) can be used to recreate every user-defined data object found in the source relational database in the target relational database, they are automatically checked for references to user-defined system objects that cannot be moved. Any references located will need to be altered in such a way that the corresponding user-defined data object in the source relational database can be successfully recreated in the target relational database.

Returning to the relational database migration workflow of FIG. 4, migration processing further includes copying database data stored in all user-defined tables to external files 420, stored temporarily in a data staging area 421. For instance, most relational database management systems have a method or process for copying data in a table to a comma-separated values (.csv) formatted file. In certain relational database management systems, this can be done using a native Export utility, while in others it can be accomplished using a bulk copy program (BCP) tool. In addition to these native utilities, data can be extracted from database tables and copied to .csv files using SQL or a combination of SQL and ODBC APIs. Since this approach offers the greatest flexibility when working with a variety of relational databases, this method can be used in one or more embodiments.

A .csv formatted file is a delimited ASCII formatted file that uses a comma to separate individual values. Each line of the file is a complete, individual data record that consists of comma-separated values, that represent one value for every column in the table. Thus, data from .csv files can be readily retrieved and copied to a relational database table. However, one issue with using .csv files to move data between database platforms is that the information stored in a .csv file, including information that should be maintained confidential, is "open" and visible to any entity gaining access to the file. This is true even if the information is coming from an encrypted database. Therefore, when .csv-formatted files are used for data migration, they need to be stored in a secure location (such as at the client's datacenter), and they need to be permanently and securely deleted when they are no longer needed.

As illustrated in FIG. 4, the database migration process executes a subset of the generated SQL statements to recreate objects needed before data movement 422. For instance, in one or more embodiments, the source and/or target relational databases can include a command line processor (CLP), which is a text-oriented application that allows users to issue relational database management system commands, operating system commands, and SQL statements, as well as view the results of the statement(s)/command(s) executed. Further, since such an application can often be run in batch mode, it provides an approach to processing the DDL statements that are required to recreate all the objects in the target relational database. In one or more embodiments, when the CLP is run in batch mode, it is assumed that all commands and/or SQL statements to be executed have been stored in an ASCII-formatted text file and the name of the file containing these commands and statements can be passed to the CLP as an option when invoked. While other approaches can be used to execute the generated SQL statements (which may, in certain cases, have been altered when copying data in user-defined tables to external files), CLP can be used when native on the source and/or target relational database. An added benefit is that it can be invoked multiple times using a different input file with each invocation. This simplifies the process of executing two different SQL DDL files, i.e., the SQL statements to recreate data objects (before data movement) 416 and the SQL statements to recreate data objects (after data movement) 418. By using a CLP application and multiple SQL DDL script files, the objects needed in the target relational database can be recreated, both before and after the database is populated, as described herein.

As illustrated in FIG. 4, in one embodiment, relational database migration processing further includes disabling constraint checking 424 for the target relational database 432. Often, data in a database needs to adhere to a set of rules and restrictions. For instance, many companies have a specific format and numbering sequence used when generating purchase order numbers. The logic required to enforce these rules and restrictions can often be placed directly in a relational database by means of one or more data constraints. Data constraints are special rules that govern how new data values can be added to a table, as well as how existing values can be altered once they have been stored. Unfortunately, the restrictions that constraints place on how data is added to or altered in a database can create problems for database migration. Either data needs to be loaded in a particular order, or any constraints that have been defined need to be temporarily disabled before data is added. In this case, because the goal is to populate the database as fast as possible without being limited by the order in which user-defined tables are loaded, data constraint enforcement is temporarily disabled to facilitate the migration process.

For instance, one or more existing relational database management systems provide users with an ability to convert traditional constraints into what are known as informational, or similar constraints. Informational constraints are used to tell the relational database management system which rules data conforms to, but unlike other constraints, they are not enforced by the system. Rather, in one or more embodiments, informational constraints can be used to tell the database management system query optimizer that certain rules exist so that it can utilize this information to choose the best access plan to use when retrieving data.

In one or more embodiments, disabling constraint checking 424 can include scanning the database's system catalog (a special set of tables and views that describe the structure of the database) to obtain a list of every data constraint that was created when the source relational database primary data objects were recreated (that is, when the SQL statements to recreate data objects needed before data movement were executed 422). A series of ALTER SQL statements can then be executed (e.g., via ODBC) to convert every data constraint found into an informational, or similar constraint so that it will not be enforced while data is being loaded into the target relational database.

Figure 6:
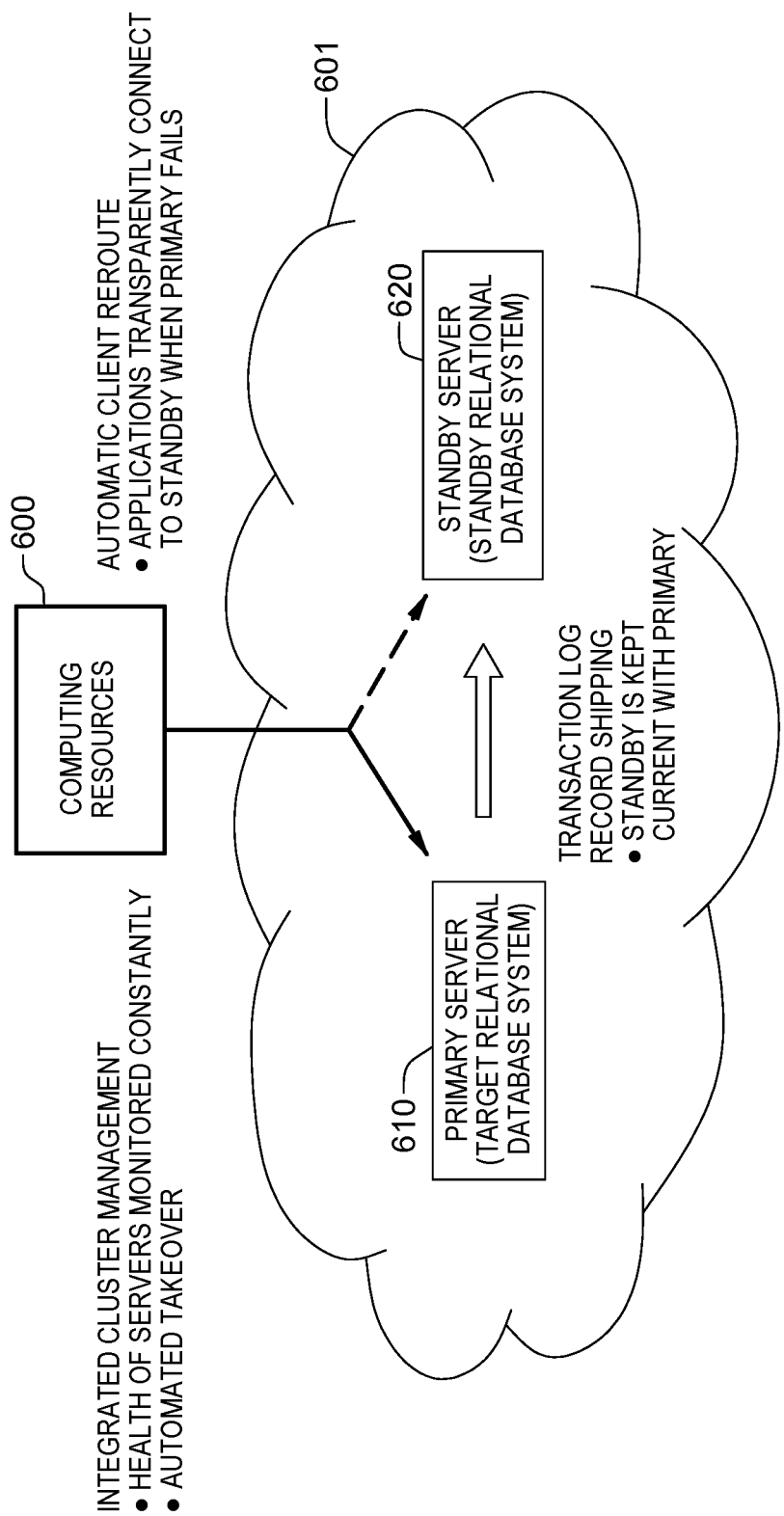
FIG. 6 illustrates one embodiment of a cloud-based, high-availability target relational database to which database data and user-defined data objects of a relational database can be migrated, in accordance with one or more aspects of the present disclosure.

In one or more embodiments, the relational database migration processing of FIG. 4 includes copying the data stored in all user-defined tables 420 from the data staging area 421 to the target relational database 432. In one or more embodiments, the source and/or target relational databases can have multiple native data movement tools, such as Export, Import, Ingest and Load utilities. However, not all of these tools can be used to transfer data between external files and the target relational database. For instance, the target relational database may be configured to support an Enterprise High Availability plan that is available for certain clients whose workloads require the highest levels of availability possible. One embodiment of infrastructure required for such a plan is depicted in FIG. 6, which is an example of a cloud-based computing environment including computing resources 600, with a primary server 610 supporting a target relational database management system, as well as a standby server 620 supporting a standby relational database management system. In this example, primary server 610 and standby server 620 represent a clustered pair of servers. In the event of failure of primary server 610, the computing environment automatically fails over to standby server 620 (and reroutes connected applications to the standby server) to ensure that the database always remains accessible. Within this environment, integrated cluster management software monitors the health of the servers constantly and automates takeover from one server to the other. Further, the Enterprise High Availability implementation of FIG. 6 includes automatic client rerouting, where applications are transparently connected to the standby server when the primary server fails. Within the environment, database transaction log record shipping is implemented to maintain the standby server and ensure the standby relational database is synchronized with the primary relational database. With such an implementation, when the target relational database is created (e.g., on a primary server), a backup copy is automatically created on the standby server, which is kept synchronized with the production database (on the primary server) by shipping translation log records to the standby server where they are then replayed against the standby relational database. In one or more embodiments, applications can connect to, for instance, cloud-based computing resource 600 through a single floating IP (internet protocol) address to ensure that they are always pointing to the correct server. This can be done to enable the Enterprise High Availability, or similar plan to be activated at any time with minimal impact to the client.

In one or more embodiments, "not logged" operations, that is, database operations that cannot be effectively replayed at the standby server because transaction log records are not generated for them, are prevented. Thus, some table population operations may be prohibited because they do not generate the log records needed for standby relational database synchronization. In one or more embodiments, an Ingest utility or similar tool can be used for rapid "bulk loading" of the target relational database, but may have certain limitations. Therefore, in one or more embodiments, at the beginning of copying data stored in external files to the appropriate tables in the target relational database 426 (FIG. 4), the processing uses information obtained about all user-defined data objects in the source relational database 412 to determine whether an Import utility or similar tool that is slower but does not have limitations or an Ingest utility or similar tool that is faster, but may have limitations should be used to copy data that was extracted from the source relational database to the target relational database, with the Ingest utility or similar tool being used (in one embodiment) as much as possible since it is the fastest of the two. The appropriate tool will then be used to copy the data from the data staging area 421 to the appropriate data object in the target relational database. Following the same process used to execute the SQL statements to recreate objects needed before data movement, the CLP or similar utility and appropriate SQL DDL script file previously generated 418 are used to recreate the objects in the target relational database that can only be created after the database has been populated 428. In one embodiment, this is done using the second SQL DDL file produced when the SQL statements needed to recreate the data objects found were generated 414.

As illustrated in FIG. 4, in one or more embodiments, once data movement is complete, all constraint checking in the target relational database can be enabled 430. For instance, during this step of the process, any data constraints that were converted to informational or similar constraints (that is, that were converted as a result of disabling constraint checking 424) so that they would not be enforced while data was being loaded, are modified (for instance, using a series of ALTER SQL statements) to return them to data constraints that are enforced going forward. Note that with respect to FIG. 4, in one or more embodiments, steps 412, 414 & 420 can be executed against the source relational database, while steps 422, 424, 426, 428 & 430 can be executed against the target relational database. However, to prevent a breech in security, particularly if the source relational database is encrypted, all these steps can be executed from the source relational database management system server. For instance, after steps 412, 414 & 420 have completed, a connection to the target database can be established using transport layer security (TLS), which is a cryptographic protocol that is designed to provide secure communications over a network. Subsequent SQL and data movement operations (i.e., steps 422, 424, 426, 428 & 430) would then be initiated at the source relational database management system server, flow through the TLS connection, and then be performed at the target relational database. This prevents plain text data files that might contain sensitive information (generated in step 420) from leaving the source relational database management system server, and ensures that control of the files remain under the source relational database management system user, which has the authority to view and extract the sensitive data.

In one or more embodiments, the relational database migration processing can further locate data objects in the target relational database that did not appear to be used in the source relational database, and remove those unused objects. For instance, in one or more embodiments, once user-defined data objects and their corresponding data have been copied to the target relational database, one or more machine learning models can be used to query the system catalog of the source relational database and potentially search through the source code of applications that currently interact with that database, to identify objects that are unused (e.g., including any that have not been used for a specified length of time). Any object identified as being unused is flagged so that they can be removed, and the client can be prompted to continue or stop the process to remove them from the target relational database. This can be accomplished, in one or more embodiments, by executing one or more DROP SQL statements.

Figure 7:
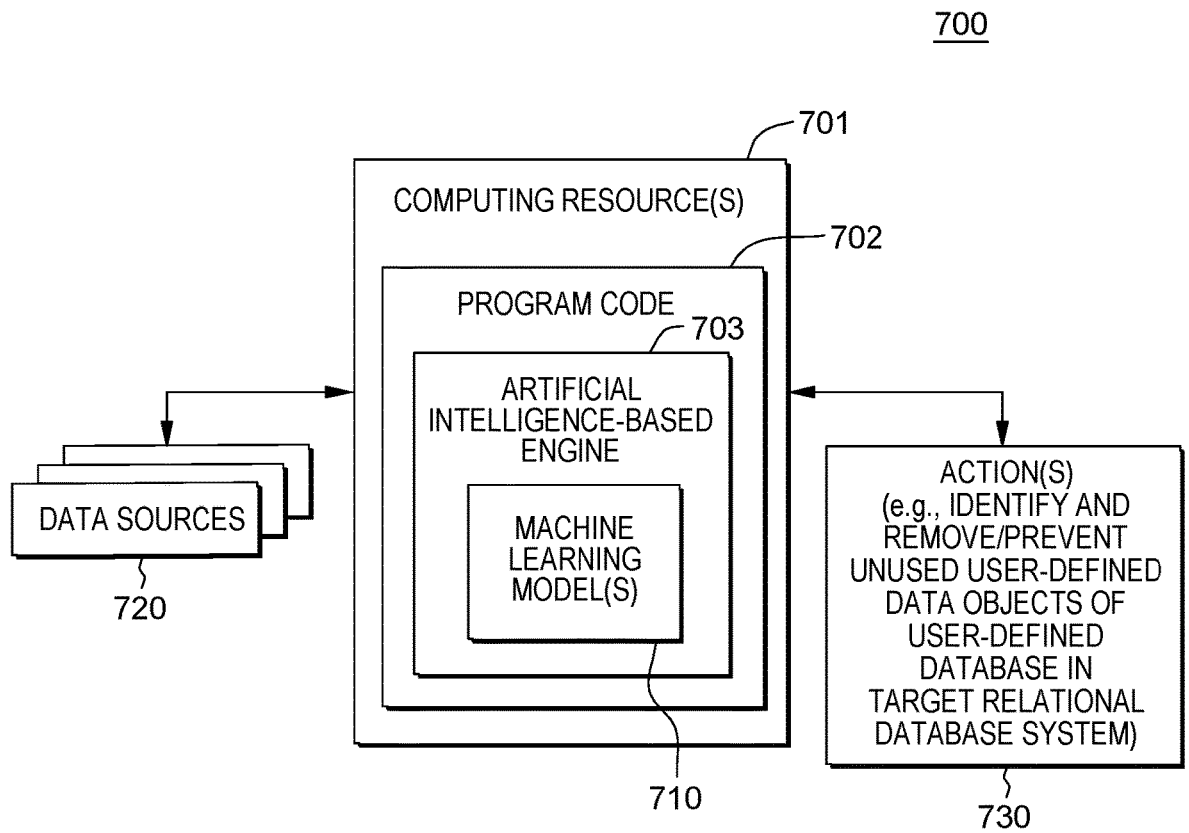
FIG. 7 is a further example of a computing environment to include and/or use one or more aspects of the present disclosure.

By way of further explanation, FIG. 7 depicts another embodiment of a computing environment or system 700, which can incorporate, or implement, one or more aspects of an embodiment of the present disclosure. In one or more implementations, system 700 is implemented as part of a computing environment, such as computing environment 100 described above in connection with FIG. 1. System 700 includes one or more computing resources 701 that execute program code 702 that implements, for instance, one or more aspects of a module or facility such as disclosed herein, and which includes an artificial-intelligence-based engine 703, which can utilize one or more machine learning models 710, such as described herein. Data, such as information about the source relational database which relates to user-defined objects (such as tables, views, storage procedure, user-defined functions, etc.) that exist in the relational database that are unused (e.g., not being used or unnecessary), can be used by the artificial-intelligence-based engine (in one embodiment) to train machine learning model(s) 710 to (for instance) identify the unused user-defined data objects in the source relational database and/or to facilitate preventing identified unused user-defined data objects from being copied into the target relational database or to facilitate removing the unused user-defined data objects from the target relational database 730, based on the particular application of the machine learning model(s). In one implementation, system 700 can include, or utilize, one or more networks for interfacing various aspects of computing resource(s) 701, as well as one or more data sources 720 providing data, and one or more components, systems, etc., receiving an output, action, etc., 730 of machine learning model(s) 710 to facilitate performance of one or more artificial intelligence system operations. By way of example, the network(s) can be, for instance, a telecommunications network, a local-area network (LAN), a wide-area network (WAN), such as the Internet, or a combination thereof, and can include wired, wireless, fiber-optic connections, etc., operatively coupling the computing resource(s) 701 to the to the data sources. The network(s) can include one or more wired and/or wireless networks that are capable of receiving and transmitting data, including training data for the machine-learning model, and an output solution, recommendation, action, of the machine-learning model(s), such as discussed herein.

In one or more implementations, computing resource(s) 701 house and/or execute program code 702 configured to perform methods in accordance with one or more aspects of the present disclosure. By way of example, computing resource(s) 701 can be a computing-system-implemented resource(s). Further, for illustrative purposes only, computing resource(s) 701 in FIG. 7 is depicted as being a single computing resource. This is a non-limiting example of an implementation. In one or more other implementations, computing resource(s) 701 can, at least in part, be multiple separate computing resources or systems, such as one or more computing resources of a cloud-hosting environment, by way of example only.

Briefly described, in one embodiment, computing resource(s) 701 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed are described further herein with reference to the figures.

In one embodiment, program code 702 executes artificial intelligence-based engine 703 which includes (and optionally trains) one or more models 710. The models can be trained using training data that can include a variety of types of data, depending on the model and the data sources. In one or more embodiments, program code 702 executing on one or more computing resources 701 applies one or more algorithms of artificial intelligence-based engine 703 to generate and train the model(s), which the program code then utilizes to, for instance, identify unused user-defined data objects of the relational database in the source relational database management system and/or to facilitate preventing the identified unused user-defined data objects from being copied into the target relational database or to facilitate removing the unused user-defined data objects from the migrated relational database in the target relational database management system 730, based on the particular application of the machine learning model(s). In an initialization or learning stage, program code 702 trains one or more machine learning models 710 using obtained training data that can include, in one or more embodiments, one or more data source inputs, such as described herein.

Data used to train the models, in one or more embodiments of the present disclosure, can include a variety of types of data, such as heterogeneous data generated by multiple data sources and/or data stored in one or more databases accessible by, the computing resource(s). Program code, in embodiments of the present disclosure, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h(x), also referred to as a hypothesis, which the program code utilizes as a model. In identifying machine learning model(s) 710, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weight various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing one or more of a natural language classifier, retrieve-and-rank application programming interfaces, and tradeoff analytics application programing interfaces.

In one or more embodiments of the present disclosure, the program code can utilize one or more neural networks to analyze training data and/or collected data to generate an operational machine-learning model 710. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex datasets, neural networks and deep learning provide solutions to many problems in multi-source processing, which program code, in embodiments of the present disclosure, can utilize in implementing a machine-learning model, such as described herein.

Those skilled in the art will note that described herein are computer-implemented methods, computer systems and computer program products for securely migrating one or more relational databases in a source relational database management system (e.g., an on-premises relational database) to a target relational database (for instance, a cloud-based database environment), where the target relational database can be, in one embodiment, a fully managed database environment. The relational database migration processing described automates and streamlines database migration processing by, for instance, reverse engineering the relational database in the source relational database management system to obtain structured query language (SQL) data definition language (DDL) statements that are then used to recreate the user-defined data objects, and combining the functionality of native relational database tools with a customized DDL generation engine and a set of artificial intelligence algorithms or models that facilitate the creation or population of, for instance, the source database data objects being used in a target relational database.

Disclosed herein, in one or more aspects, are a relational database migration module and processing that migrates a relational database of a source relational database management system to a target relational database of a target relational database management system, where the target relational database management system can be a fully managed database environment, such as a fully managed cloud-based database environment. Using the relational database migration processing, a user can designate a specific database to migrate, and all appropriate user-defined data objects (e.g., tables, indexes, views, etc.), together with each object's data, will be automatically replicated in the target relational database. In addition, user-defined system objects (for example, buffer pools, storage groups, and table spaces) are automatically consolidated into default system objects used by the target relational database. Further, in one or more aspects, artificial intelligence algorithms can be used to identify and prevent user-defined objects, such as tables, views, user-defined functions, storage procedures, and triggers, that exist in the source relational database but are not being used, from being replicated during the migration process to the target relational database.

In one specific embodiment, a method for securely migrating a relational database from one environment to another environment is provided. The method includes, for instance, reverse engineering the relational database using, for instance, an open database connectivity (ODBC) API, and based on the ODBC output, generating SQL statements (e.g., SQL DDL statements) to recreate all user-defined data objects of the database in the target relational database. Further, in one or more embodiments, the method for securely migrating the relational database can include identifying all user-defined system objects that exist in the source relational database that cannot be directly recreated in the target relational database, and modifying the definition of those data objects that rely on these user-defined system objects such that they utilize the default system objects used by the target relational database management system. In one or more embodiments, the method further includes, for instance, identifying, using a trained machine learning model, user-defined data objects (e.g., tables, views, storage procedures, user-defined functions, triggers) that exist in the source relational database that are unused or unnecessary, and preventing them from being replicated in the target relational database during migration. Further, in one or more aspects, the relational database migration process can include a facility to backout any changes to the target relational database based on the migration failing or being interrupted. In one or more implementations, the source relational database management system can be the same as the target relational database management system (homogeneous) or different (heterogeneous).

Advantageously, the relational database migration method, system and computer program product disclosed herein utilize, in one or more embodiments, open database connectivity (ODBC) application programming interface (API) function calls to reverse engineer the relational database of the source relational database management system and generate, for instance, SQL DDL statements that are used to recreate all user-defined data objects in the target relational database that are found in the source relational database. In one or more embodiments, the relational database management processing identifies all user-defined system objects that exist in the relational database that cannot be recreated directly in the target relational database and modifies the definition of data objects that rely on those system objects, such that they utilize, for instance, predefined (default) system objects provided with the target relational database. In one or more embodiments, the relational database migration process further utilizes artificial intelligence to identify user-defined data objects such as tables, views, procedures, user-defined functions and triggers that exist in the source relational database that are unnecessary or not being used, and provides an ability to prevent those objects from being replicated in the target relational database during migration. Further, in one or more embodiments, the relational database migration process is configured to allow backing out of changes made to the target relational database system in the event the migration process fails or is terminated prematurely.

The terminology used herein is for the purpose of describing particular embodiments only and is not intended to be limiting of the disclosure. As used herein, the singular forms "a", "and" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
    migrating a relational database of a source relational database management system to a target relational database of a target relational database management system, the migrating comprising:
        identifying user-defined data objects of the relational database in the source relational database management system;
        generating statements to recreate the identified user-defined data objects of the relational database in the target relational database management system, the statements including one set of statements to recreate one set of user-defined data objects at the target relational database prior to database data movement to the target relational database, and another set of statements to recreate another set of user-defined data objects at the target relational database after the database data movement to the target relational database; and
        initiating execution of the one set of statements to recreate the one set of user-defined data objects of the relational database in the target relational database management system prior to the database data movement, while holding execution of the other set of statements to recreate the other set of user-defined data objects until after the database data movement to the target relational database.

2. The computer-implemented method of claim 1, wherein the migrating is performed from the source relational database management system, and the identifying comprises reverse-engineering the relational database to identify the user-defined data objects of the relational database.

3. The computer-implemented method of claim 2, wherein the reverse-engineering comprises reverse-engineering the relational database using Open Database Connectivity (ODBC) Application Programing Interfaces (APIs) to identify the user-defined data objects of the relational database.

4. The computer-implemented method of claim 2, wherein the reverse-engineering comprises reverse-engineering the relational database to identify all user-defined data objects of the relational database, and the generating comprises generating structured query language statements to recreate, at least in part, the identified user-defined data objects of the relational database in the target relational database management system.

5. The computer-implemented method of claim 1, wherein the migrating further comprises:
copying database data stored in user-defined tables of the relational database of the source relational database management system to external files; and
wherein the executing comprises executing at least one statement of the one set of statements of the generated statements to recreate a subset of the identified user-defined data objects of the relational database in the target relational database management system needed before copying of the database data into the target relational database.

6. The computer-implemented method of claim 5, wherein the migrating further comprises:
copying the database data stored in the external files to respective tables in the target relational database; and
wherein the executing comprises executing at least one other statement of the other set of statements of the generated statements to recreate another subset of the user-defined data objects of the relational database in the target relational database management system that can only be created after the database data has been copied into the target relational database.

7. The computer-implemented method of claim 6, wherein the migrating further comprises:
identifying a data constraint created in the target relational database system based on recreating the subset of user-defined data objects in the target relational database; and
converting the identified data constraint into an unenforced data constraint which is not enforced while the other subset of user-defined data objects is recreated in the target relational database.

8. The computer-implemented method of claim 7, wherein the migrating further comprises, based on recreating the other subset of the user-defined data objects in the target relational database system, returning the unenforced data constraint to the data constraint for enforcement by the target relational database management system.

9. The computer-implemented method of claim 1, wherein the migrating further comprises:
identifying, using a trained machine learning model, unused user-defined data objects of the relational database of the source relational database management system; and
preventing the unused user-defined data objects of the relational database from being recreated in the target relational database.

10. The computer-implemented method of claim 1, wherein the migrating further comprises:
detecting a failure of the migrating of the relational database of the source relational database management system to the target relational database; and
based on detecting the failure of the migrating, backing out any changes to the target relational database from the failed migrating of the relational database of the source relational database management system to the target relational database management system.

11. The computer-implemented method of claim 1, wherein the source relational database management system and the target relational database management system comprise homogeneous relational database management systems.

12. The computer-implemented method of claim 1, wherein the source relational database management system and the target relational database management system comprise heterogeneous relational database management systems.

13. A computer system for facilitating processing within a computing environment, the computer system comprising:
a memory; and
at least one processor in communication with the memory, wherein the computer system is configured to perform a method, the method comprising:
migrating a relational database of a source relational database management system to a target relational database of a target relational database management system, the migrating comprising:
identifying user-defined data objects of the relational database in the source relational database management system;
generating statements to recreate the identified user-defined data objects of the relational database in the target relational database management system, the statements including one set of statements to recreate one set of user-defined data objects at the target relational database prior to database data movement to the target relational database, and another set of statements to recreate another set of user-defined data objects at the target relational database after the database data movement to the target relational database; and
initiating execution of the one set of statements to recreate the one set of user-defined data objects of the relational database in the target relational database management system prior to the database data movement, while holding execution of the other set of statements to recreate the other set of user-defined data objects until after the database data movement to the target relational database.

14. The computer system of claim 13, wherein the identifying comprises reverse-engineering the relational database to identify all user-defined data objects of the relational database, and the generating comprises generating structured query language statements to recreate, at least in part, the identified user-defined data objects of the relational database in the target relational database management system.

15. The computer system of claim 13, further comprising:
copying database data stored in user-defined tables of the relational database of the source relational database management system to external files; and
wherein the executing comprises executing at least one statement of the one set of statements of the generated statements to recreate a subset of the identified user-defined data objects of the relational database in the target relational database management system needed before copying of the database data into the target relational database.

16. The computer system of claim 15, further comprising:
copying the database data stored in the external files to respective tables in the target relational database; and wherein the execution comprises executing at least one other statement of the other set of statements of the generated statements to recreate another subset of the user-defined data objects of the relational database in the target relational database management system that can only be created after the database data has been copied into the target relational database.

17. The computer system of claim 16, further comprising:
identifying a data constraint created in the target relational database system based on recreating the subset of user-defined data objects in the target relational database; and
converting the identified data constraint into an unenforced data constraint which is not enforced while the other subset of user-defined data objects is recreated in the target relational database.

18. The computer system of claim 17, wherein the migrating further comprises, based on recreating the other subset of the user-defined data objects in the target relational database, returning the unenforced data constraint to the data constraint for enforcement by the target relational database management system.

19. A computer program product for facilitating processing within a computing environment, the computer program product comprising:
one or more computer readable storage media and program instructions collectively stored on the one or more computer readable storage media readable by at least one processing circuit to:
migrating a relational database of a source relational database management system to a target relational database of a target relational database management system, the migrating comprising:
identifying user-defined data objects of the relational database in the source relational database;
generating statements to recreate the identified user-defined data objects of the relational database in the target relational database management system, the statements including one set of statements to recreate one set of user-defined data objects at the target relational database prior to database data movement to the target relational database, and another set of statements to recreate another set of user-defined data objects at the target relational database after the database data movement to the target relational database; and
initiating execution of the one set of statements to recreate the one set of user-defined data objects of the relational database in the target relational database management system prior to the database data movement, while holding execution of the other set of statements to recreate the other set of user-defined data objects until after the database data movement to the target relational database.

20. The computer program product of claim 19, wherein the identifying comprises reverse-engineering the relational database to identify all user-defined data objects of the relational database, and the generating comprises generating structured query language statements to recreate, at least in part, the identified user-defined data objects of the relational database in the target relational database management system.

* * * * *